United States Patent
Botscheck et al.

(10) Patent No.: US 7,340,679 B2
(45) Date of Patent: Mar. 4, 2008

(54) PROCESSING LIFE AND WORK EVENTS

(75) Inventors: Martin Botscheck, Foster City, CA (US); Udo Waibel, Foster City, CA (US); Mirjam Sonnleithner, San Francisco, CA (US); Monty Gray, Menlo Park, CA (US); Wolfram Hepp, Heidelberg (DE); Martin Zurmuehl, Muehlhausen (DE); Heiko Schultze, Weisloch (DE); Mikio Takagi, Angelbachtal (DE); Wolfgang Kuhn, Sinsheim (DE); Herbert Penzkofer, Heidelberg (DE)

(73) Assignee: SAP AG, Walldorf (DE)

( * ) Notice: Subject to any disclaimer, the term of this patent is extended or adjusted under 35 U.S.C. 154(b) by 1149 days.

(21) Appl. No.: 10/161,071

(22) Filed: May 31, 2002

(65) Prior Publication Data

US 2003/0204429 A1    Oct. 30, 2003

Related U.S. Application Data

(63) Continuation of application No. 10/137,212, filed on Apr. 30, 2002.

(60) Provisional application No. 60/375,371, filed on Apr. 24, 2002.

(51) Int. Cl.
G06F 3/00 (2006.01)
G06F 9/46 (2006.01)

(52) U.S. Cl. ............... 715/738; 715/751; 715/853; 715/742; 715/963; 705/8; 705/9

(58) Field of Classification Search .......... 715/709, 715/712–713, 742, 751, 963; 705/7–9
See application file for complete search history.

(56) References Cited

U.S. PATENT DOCUMENTS

| 5,774,661 | A  | * | 6/1998 | Chatterjee et al. | 709/203 |
| 6,115,640 | A  | * | 9/2000 | Tarumi | 700/99 |
| 6,578,006 | B1 | * | 6/2003 | Saito et al. | 705/9 |
| 7,062,537 | B2 | * | 6/2006 | Aziz et al. | 709/206 |
| 7,065,493 | B1 | * | 6/2006 | Homsi | 705/8 |

(Continued)

OTHER PUBLICATIONS

U.S. Appl. No. 10/137,212, filed Apr. 30, 2002, entitled "Processing Life and Work Events."

(Continued)

*Primary Examiner*—Sy D. Luu
(74) *Attorney, Agent, or Firm*—Finnegan, Henderson, Farabow, Garrett & Dunner, L.L.P.

(57) ABSTRACT

A system with user interface controls, a build component, a runtime component, and a workflow engine enables a user to specify an event definition, create an event instance based on the event definition, and process the event instance. The event definition may include a list of tasks corresponding to a life or work event, a specification of resources associated with each task, and a task order. The user may deselect optional tasks, specify participants who are to collaborate in the event, and otherwise personalize the event instance. The user processes the event instance by selecting tasks in accordance with the task order. The system provides access to the resources associated with each task, and allows the user to mark tasks as completed, and to store and monitor the progress of the event instance. Multiple event instances that are created from the same event definition can be processed independently.

90 Claims, 15 Drawing Sheets

U.S. PATENT DOCUMENTS

2002/0007300 A1* 1/2002 Slatter .......................... 705/9
2003/0018512 A1* 1/2003 Dortmans ..................... 705/9
2003/0078830 A1* 4/2003 Wagner et al. ................ 705/10
2003/0154232 A1* 8/2003 Beringer et al. ............ 709/102
2003/0220707 A1* 11/2003 Budinger et al. ............. 700/97
2003/0229522 A1 12/2003 Thompson et al.
2003/0229524 A1* 12/2003 Reuveni ........................ 705/7

OTHER PUBLICATIONS

U.S. Appl. No. 10/161,064, filed May 31, 2002, entitled "Processing Life and Work Events."

U.S. Appl. No. 10/161,066, filed May 31, 2002, entitled " Processing Life and Work Events."

* cited by examiner

PROCESSING LIFE AND WORK EVENTS

CROSS-REFERENCE TO RELATED APPLICATION

This application is a continuation of U.S. application Ser. No. 10/137,212 filed Apr. 30, 2002, which claims the benefit of U.S. Provisional Application No. 60/375,371, filed Apr. 24, 2002, the contents of which are hereby incorporated by reference into this application as if set forth herein in full.

BACKGROUND

The present application relates to information management solutions, for example, for organizing access to applications, services, information, and other resources, and for handling cross-functional life and business processes.

Companies have long sought to unify disparate systems and information sources across the entire enterprise. A comprehensive unification process generally involves unifying access to multiple resources, including applications (e.g., Enterprise Resource Planning ("ERP") applications, invoicing and supply management applications, and data warehouse), services (including Web-based, client-server, and other network services), and information (e.g., stored documents. Internet and intranet information, databases, and knowledge bases). The benefits of unifying such resources include increasing the value of the individual resources through integrated operation, allowing employees to collaborate on projects, and increasing the productivity and efficiency of the entire organization.

The process of unification, however, also creates new problems and challenges. One such problem is information overload: Presented with a barrage of applications and information, users frequently spend a significant amount of time navigating through the information and locating the appropriate applications with which to process the relevant information.

Several solutions have emerged to help users locate the relevant applications, services, and information they need. For example, enterprise portals may help filter resources through the use of roles. In an enterprise portal that implements roles, each user within an organization is assigned a specific role within the organization, and the portal presents the user with choices based on his or her assigned role. For example, a user might be assigned the role of an accountant, and based on that assignment, the enterprise portal would present the user with a choice of bookkeeping applications and relevant information.

Although role-based portals help users locate resources, a user may be assigned to multiple roles, and within the course of executing one particular role, a user is provided access to a large variety of applications and information, several of which may not be relevant to the particular task the user is focused on at the time.

Another concept that has emerged to help users navigate through an enterprise system is Employee Self-Services ("ESS"). Typically built into Human Capital Management ("HCM") applications, ESS takes the approach that employees are faced with particular human resource ("HR") events that they need to deal with, and presents employees with specific tasks that they need to accomplish in order to deal with pre-defined HR events. For example, a pre-defined HR event might be a company's annual benefits open enrollment period. In order to process such an event, each employee would be presented with a list of tasks to accomplish (e.g., choose a new medical insurance provider, update the level of life insurance coverage, verify beneficiary information, and so forth). Each task is generally related to a particular application and/or to a specific set of information, and the employee is presented with only those resources that are necessary to perform that task.

SUMMARY

The Life and Work Events system and techniques described herein (the "LWE system") provides users with access to resources associated with events. Providing a user with access to resources associated with a specified event involves enabling a user to perform certain operations, including specifying a list of one or more tasks that correspond to the specified event, specifying one or more resources associated with each task in the task list, indicating a task order (including an indication of whether two or more tasks from the task list are to be performed in an order-dependent manner or in an order-independent manner), and formatting the task list into a presentation format.

The specifying, indicating, and formatting operations may be performed by an administrative-user using interface controls provided in a graphical user interface such as a browser-based application. The interface controls may include graphical abstractions (e.g., text entry fields, buttons, menus, icons, and links).

The operation of formatting the list of tasks may include specifying a navigation model (e.g., a flat list, a nested list, a tree structure, a flat list with related tasks delineated by group names, or folders) for presentation of the list of tasks.

The operation of indicating the task order may include indicating that two or more of the tasks that are to be performed in an order-dependent manner are to be performed in a specified sequence, or under the control of a wizard utility. The operation of indicating the task order may include indicating that two or more of the tasks that are to be performed in an order-independent manner may be performed in any order, or substantially in parallel. The operation of indicating the task order may also include indicating that some tasks are to be performed in an order-dependent manner, while other tasks are to be performed in an order-independent manner. The operation of indicating the task order may also include specifying task priorities.

The operation of specifying the list of one or more tasks may include specifying whether a task is optional or mandatory.

The specified event may be a life or work event, and each resource may incorporate content, functionality, or a combination of both content and functionality.

Providing a user with access to resources associated with a specified event may additionally involve enabling a user to specify a home page or a due date for the specified event, and/or to specify a task page associated with each task. It may also involve associating the specified event with one or more roles in a role-based portal.

In addition, providing a user with access to resources associated with a specified event may involve enabling the user to specify that the specified event requires collaboration among two or more participants. A collaboration specification may include an identification of one or more owners of the specified event and one or more participants in the specified event, or an identification of one or more approvers associated with the specified event.

Providing a user with access to resources associated with a specified event may further involve enabling a user to import a pre-existing event definition, to create a new version of a pre-existing event definition, or to link a specified event to a pre-existing event definition, so that subsequent modifications made to the pre-existing event definition are automatically reflected in the specified event.

Providing a user with access to resources associated with a specified event may also involve enabling the user to export the specified list of one or more tasks, the indicated task order, and the presentation format associated with the specified event.

The LWE system may include interface controls that enable a user to perform certain operations, including designating an event, generating a list of tasks associated with the event, and specifying an order for performance of the tasks in the task list that may be followed in processing an instance of the event. The user interface controls may include graphical abstractions (e.g., text entry fields, buttons, menus, icons, and links), and may be provided in a graphical user interface such as a browser-based application.

The designated event, which may be a life or work event, may correspond to an objective to be achieved. The list of tasks may include one or more tasks.

The user interface controls may also enable the user to specify a navigation model for presentation of the list of tasks.

The operation of specifying a performance order for the tasks in the task list may include specifying whether the tasks are to be performed sequentially, in parallel, or a combination of both. The operation may also include specifying whether some of the tasks are order-dependent and/or whether some of the tasks are order-independent, as well as specifying whether some of the tasks are to be processed under the control of a wizard utility.

The user interface controls may also enable the user to associate one or more resources with each task. Each resource may include content, functionality, or both.

The operation of designating an event may include providing descriptive information about the event (e.g., an event name and a textual description of the event). Similarly, the operation of generating the list of tasks may include providing descriptive information about each task (e.g., a task name and a textual description of each task).

The operation of designating an event may include copying, importing, creating a new version of, or linking the event to a pre-existing event definition. The operation may also include specifying a home page or a due date for the event.

The user interface controls may also enable the user to specify a task page for each task, and to specify that an event requires collaboration among two or more participants. In addition, the user interface controls may enable the user to associate the event with one or more roles in a role-based portal, and to export the designated event, the generated task list, and the specified performance order.

A method of the LWE system may enable an administrative-user to define events that are to be processed by end-users. The method involves providing a software environment that supports certain functions, including presenting the administrative-user with a graphical user interface-based application for generating definitions of events, receiving input from the administrative-user that defines an event (the input including a list of tasks, one or more resources associated with each task, and an indication that two or more tasks are to be performed in an order-dependent manner or in an order-independent manner), formatting the list of tasks to conform to a designated navigation model, and associating the defined event with one or more roles in a role-based portal environment.

The input from the administrative-user that defines an event may include an indication that some of the tasks are to be performed in an order-dependent manner, while other tasks are to be performed in an order-dependent manner. The input may also include a pre-existing event definition, an indication to create a new version of a pre-existing event definition, or a link to a pre-existing event definition. The administrative-user may also export the input.

The LWE system may include a machine-readable medium with instructions that, when executed, cause a machine to perform certain operations, including specifying a list of one or more tasks corresponding to a specified event, specifying one or more resources associated with each task, indicating a task order (including an indication of whether two or more tasks are to be performed in an order-dependent manner or in an order-independent manner), and formatting the task list into a presentation format.

DESCRIPTION OF FIGURES

The attached figures are incorporated into and form a part of this application.

DETAILED DESCRIPTION

Figure 1:
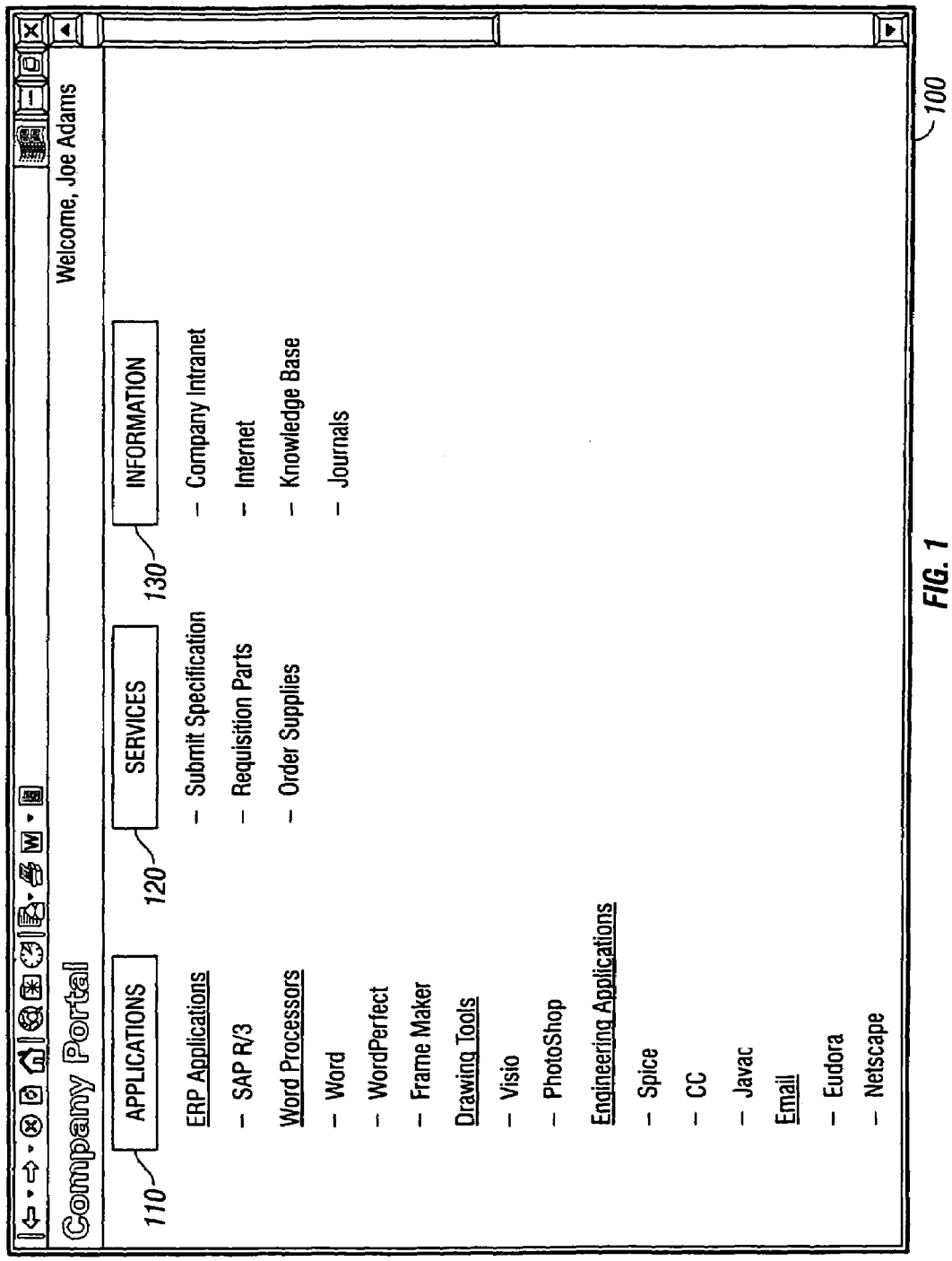
FIG. 1 is a representation of the user interface of a conventional enterprise system.

The systems and techniques described herein extend the concept of HR events to events that users may handle across the entire spectrum of their work, or for that matter, their life. Users do not typically or intuitively think about the particular applications, services, or information they might need on a particular day—rather, they tend to focus on the events that they need to deal with on that day. For example, an office manager might be presented with an event such as arranging a customer visit. Events are generally cross-functional business processes, meaning that in order to handle an event, a user may need to perform several functions or tasks. An event may generally correspond to one or more objectives to be achieved. The LWE system helps users handle events by presenting each event as a list of tasks. A task may involve running one or more applications, accessing one or more services, acquiring or providing one or more pieces of information, or a combination thereof. For example, an event such as arranging a customer visit may involve running a transaction within an ERP application such as SAP R/3 to reserve a conference room, running a word processing application to generate an agenda for the visit, obtaining some information from the customer (e.g., who will be attending the visit), and providing some information to the customer (e.g., directions to the company site).

In general, a task may involve accessing various resources, including certain content, certain functionality, or a combination of both.

The LWE system thus helps users to interact with processes that are triggered by life or work events. Rather than presenting users with menus of applications, services, or information that are arranged alphabetically or by function, the LWE system presents users with process- or event-oriented menus, wherein an event comprises a list of tasks that the user may be required to complete, and each task comprises a combination of resources that the user may be required to execute or access. By organizing and providing access to applications, services, and information resources based on events or cross-functional processes, the LWE system helps to reduce the time users spend navigating through an enterprise system to locate such resources. Moreover, by integrating resources within a task, and tasks within an event, the LWE system helps eliminate uncertainty about whether resources need to be accessed or executed in a specific sequence. The LWE system thus helps increase users' efficiency and productivity, and allows users to operate more naturally by letting them focus on the underlying business processes or events.

The disclosed LWE system provides additional benefits, including reducing the cycle time of business processes, transferring business process tasks and decisions to dispersed owners, and increasing the throughput of transactions and decisions.

The disclosed LWE system may also be applied outside of the traditional business context. For example, a government organization could use the system and method of the LWE system to enable users to handle an event such as moving to a new state, which might involve tasks such as filling out an application for a driver's license, registering one or more vehicles, registering to vote, and applying for accounts with local utilities. As another example, a portal web site could use the LWE system to help users manage an event such as getting married, which might involve a whole host of tasks related to planning the wedding ceremony, the reception, and the honeymoon trip. The disclosed LWE system can thus be utilized to handle a vast array of life and work events.

FIG. 1 shows a typical user interface 100 of a conventional enterprise system, in which resources are organized by functions. The user in this example is presented with a choice of running a number of different applications 110, interacting with a number of different services 120, or accessing a number of different information sources 130. This setup works well if the user knows which particular resource he needs to access. If the user does not know that, however, or if the user does not know the appropriate sequence in which to access resources in order to deal with a specific business event, then he typically needs to spend time identifying and locating those resources and determining an appropriate sequence.

Figure 2:
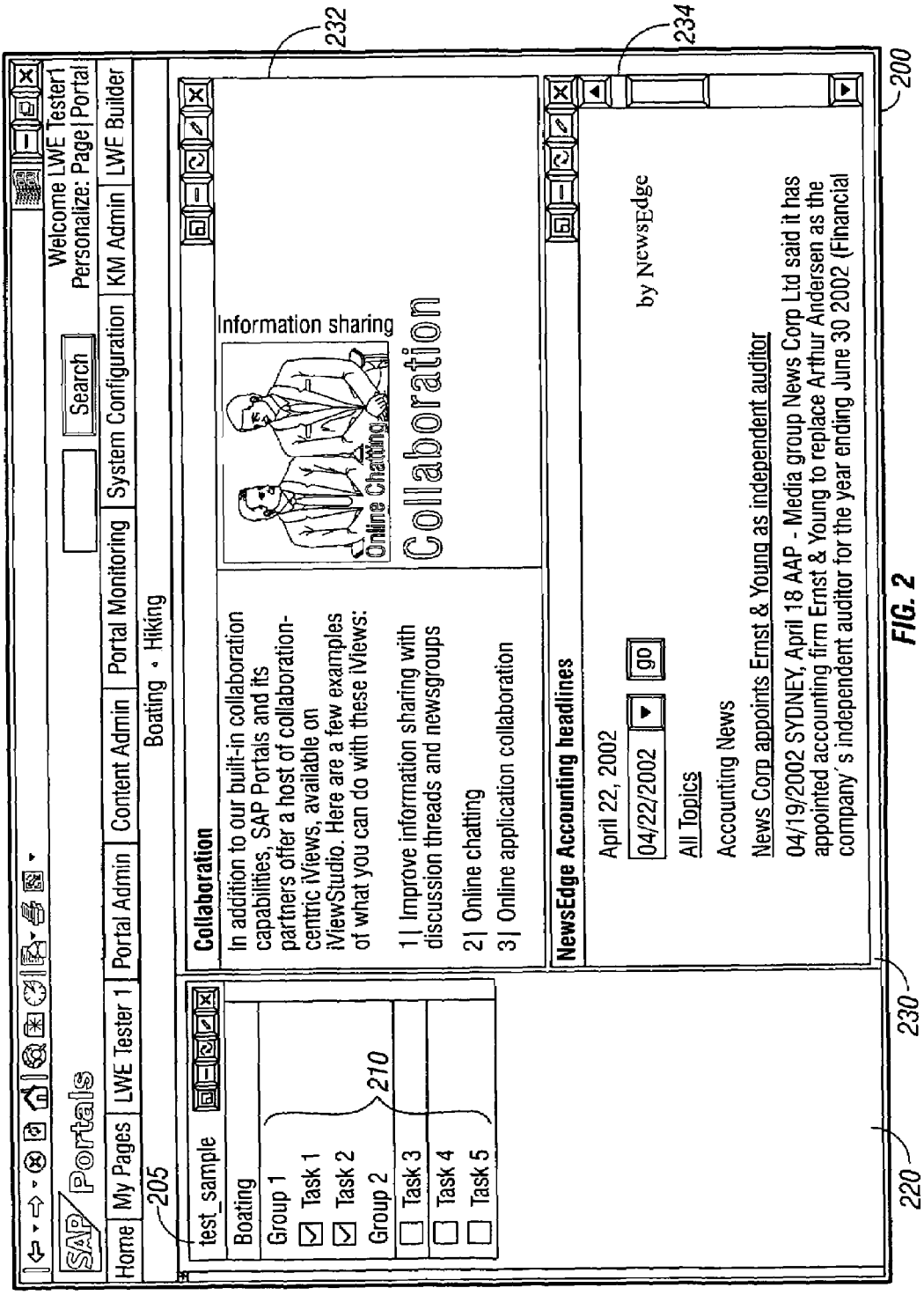
FIG. 2 illustrates an example of a user interface.

FIG. 2 illustrates an example of a user interface 200 that may be used with the LWE system. In the example in FIG. 2, the user is handling a specific event 205. The left side 220 of interface 200 lists the tasks 210 that the user is to accomplish in order to handle this event 205 successfully. The tasks 210 in this example are separated into two groups. As another illustration, the tasks that a user needs to complete in order to deal with an event such as a customer visit might be separated into three groups: the tasks needed to prepare for the visit, the tasks needed to execute the visit, and the tasks needed to follow-up on the visit. In this way, the user is intuitively guided through the set of tasks that he must perform in order to handle the event.

The right side of interface 200 shows a page—in this case, the event home page 230. Each page may include one or more "iViews." In this implementation, an iView is the smallest unit of display, and generally corresponds to one particular application, service, or segment of information. In this particular example, the event home page 230 has two iViews—a first iView 232 comprising a document that provides system information, and a second iView 234 comprising a link to an external web site that provides accounting news.

Each task also has a task page associated with it, and as with event home pages, each task page may contain multiple iViews that represent a fusion of the applications, services, and information used to execute that task. By presenting an event as a list of tasks, and each task as a combination of the resources that are required or that help in executing the task, the LWE system not only guides the user in the appropriate sequence of steps to take so as to process the event successfully, but also helps the user locate such resources efficiently.

Some enterprise portals are role-based, meaning that they present a different set of resources and/or functionality depending on a user's assigned role (e.g., administrator, developer, manager, etc.). When used in conjunction with a role-based enterprise portal, each event may be assigned to one or more roles, and each role may be assigned to one or more users. For example, events may be defined for and assigned to roles such as "manager" or "team assistant," or even a more generic role such as "employee." Each user would then be able to instantiate and process the events that are associated with his role(s). In such an implementation, the task of navigating through enterprise resources is even more efficient, as a user may be presented only with the events, tasks, and resources that are relevant to his particular role(s).

The layout of the iViews within an event home page or a task page may be adjusted by an administrator in the process of building the event definition, as is described in greater detail below. In one embodiment, users may also specify additional resources that may be displayed in additional iViews. The personalization and display of iViews and resources within event and task pages may be built directly into the LWE system; alternatively, such features may be implemented through functionality provided in an underlying system, such as an enterprise portal.

An advantage of the LWE system is that it fuses together the resources needed to execute specific tasks and events. Such resources may include many different types of content from disparate sources. For example, content may be structured data such as business intelligence content. Content may also be unstructured data, such as knowledge management documents. In general, content may include any data that is capable of being displayed in an enterprise portal system.

Figure 3A:
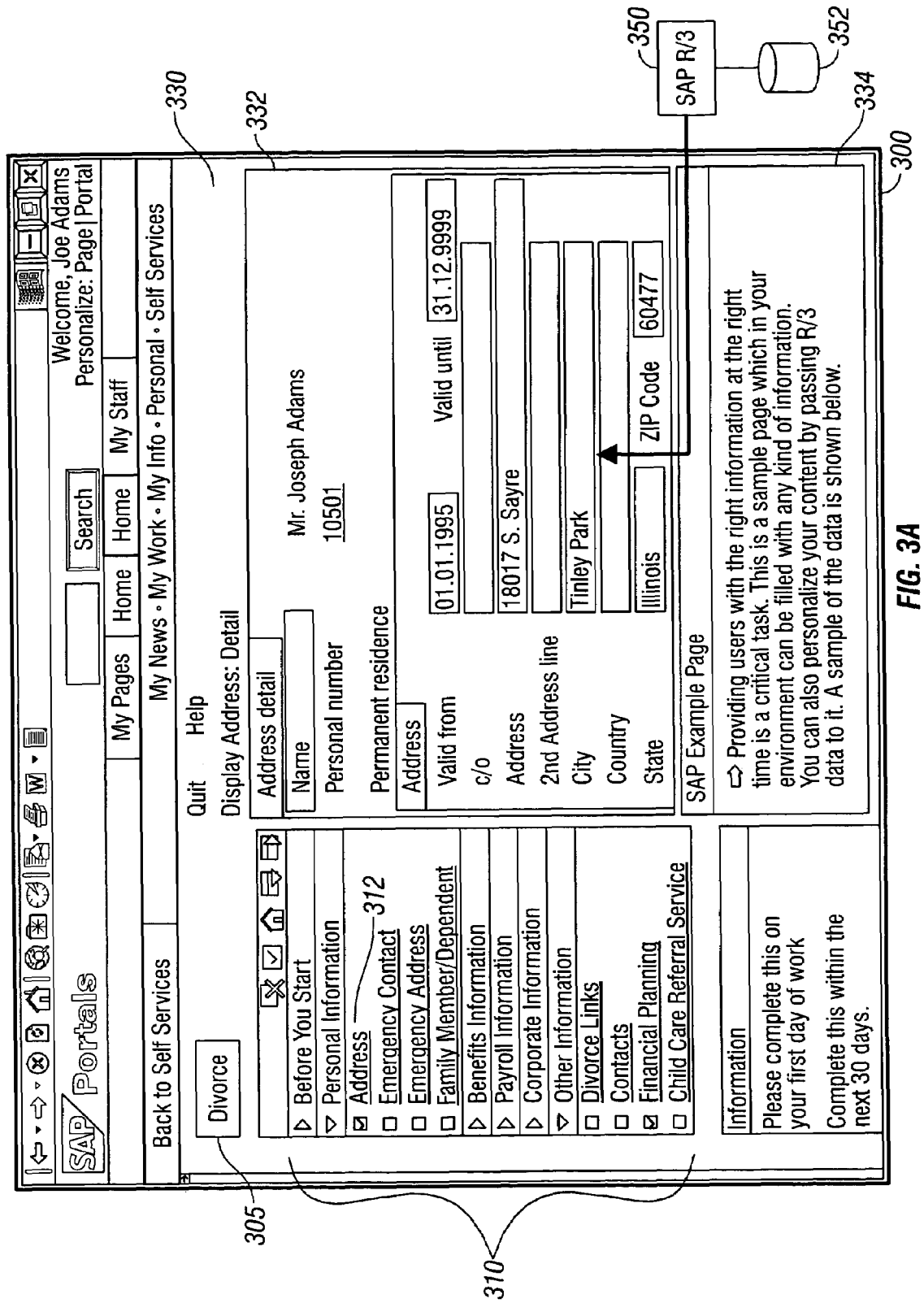
FIG. 3a illustrates a user interface with a pre-populated form.

FIG. 3a illustrates the execution of a data provider, which is another aspect of the LWE system. A data provider allows data to be extracted from various sources and pushed to various destinations. For example, data may be extracted from an ERP system or from an enterprise portal. ERP data may be any data stored in the ERP system, such as, for example, data from employee records. Enterprise portal data may include portal user management data such as user IDs and passwords. The underlying systems from which data is imported may include systems from disparate vendors, such as Oracle and PeopleSoft. In an implementation in which the LWE system is used in conjunction with an enterprise portal, a data provider may generally import information from any data source connected to the portal.

Extracted data may be used in event instances. For example, ERP data from employee records may be used in a "performance review" event. Extracted data may also be pushed into iViews. As an example, in FIG. 3a, extracted data is used to pre-populate an iView corresponding to a form that needs to be filled out. In the example in FIG. 3a, the user is processing a "divorce" event 305, which requires him to complete the tasks in task list 310. One of those tasks is task 312, which requires the user to update his address information. Task page 330, which corresponds to task 312, is shown on the right side of the interface 300. Task page 330 contains two iViews—iView 332, which is a form that the user needs to fill out with his address information, and iView 334, which provides some additional information. In this example, the user's address information is stored in employee database 352 of ERP system 350. The data provider extracts the user's address information from employee database 352, and uses it to pre-populate the form in iView 332.

Figure 3B:
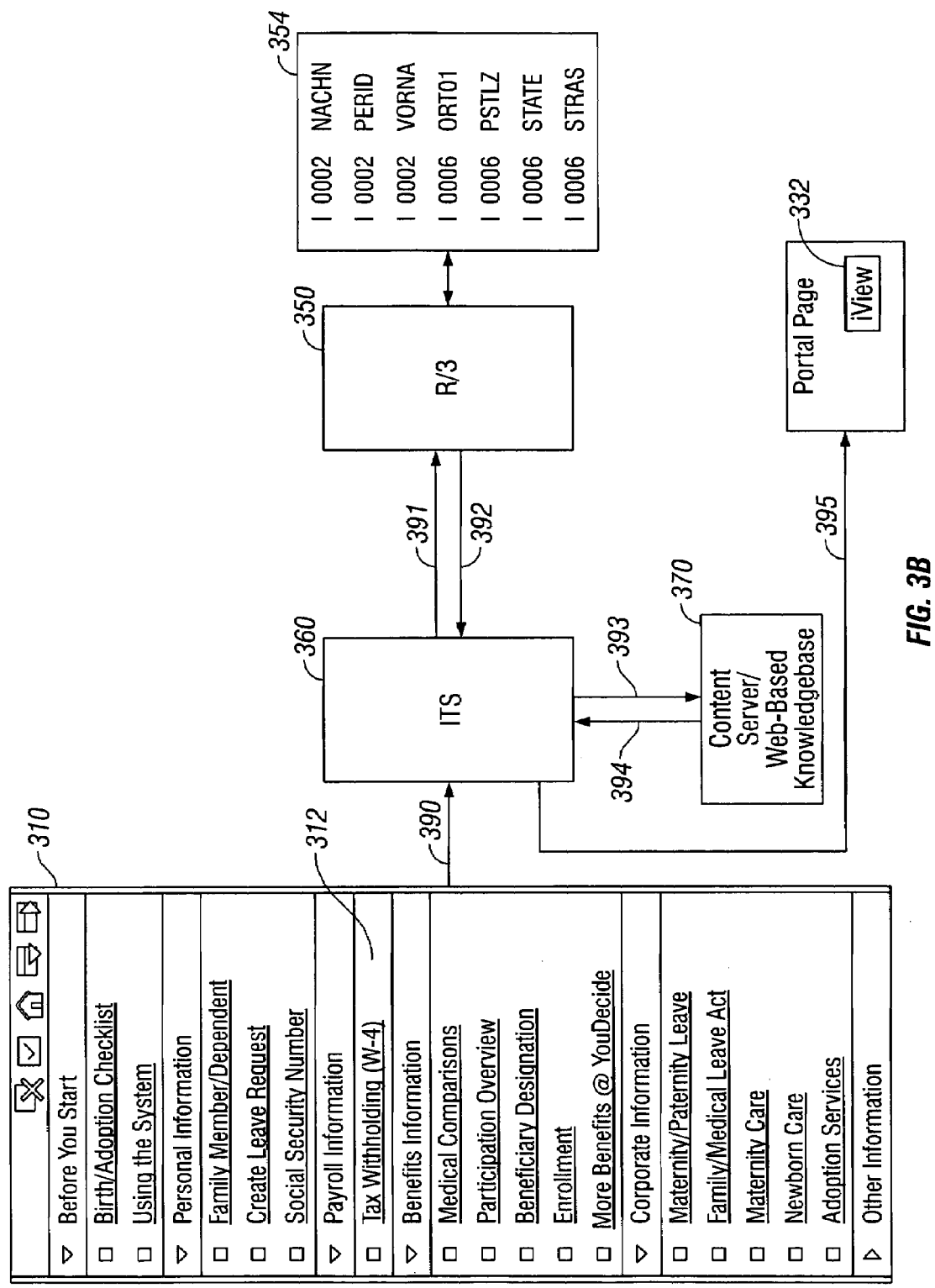
FIGS. 3b and 3c illustrate data flow.

FIG. 3b illustrates an example of how a data provider may be implemented. In the example, a user clicks on a task 312 in task list 310 that requires data 354 from the underlying SAP R/3 ERP system 350, which generates a request 390 to an Internet Transaction Server ("ITS") 360. The ITS 360 module presents ERP functionality via a browser interface—in essence, it is a browser interface to the ERP system 350. The ITS 360 sends a data request 391 to ERP system 350, which returns the requested data 354 in return message 392. The ITS 360 then sends this data 354 to a web-based knowledge base 370 in message 393, which creates an HTLM document containing the data 354. The HTML document is returned to the ITS 360 in return message 394, and presented to the user in an iView 332, as shown in step 395.

A data provider may also be able to export data into an ERP or other system. A task might thus involve running an application in a third-party system, importing the data accessed or generated by that application into an iView, executing an application to process that data, and then exporting the processed data back into the third-party system.

Figure 3C:
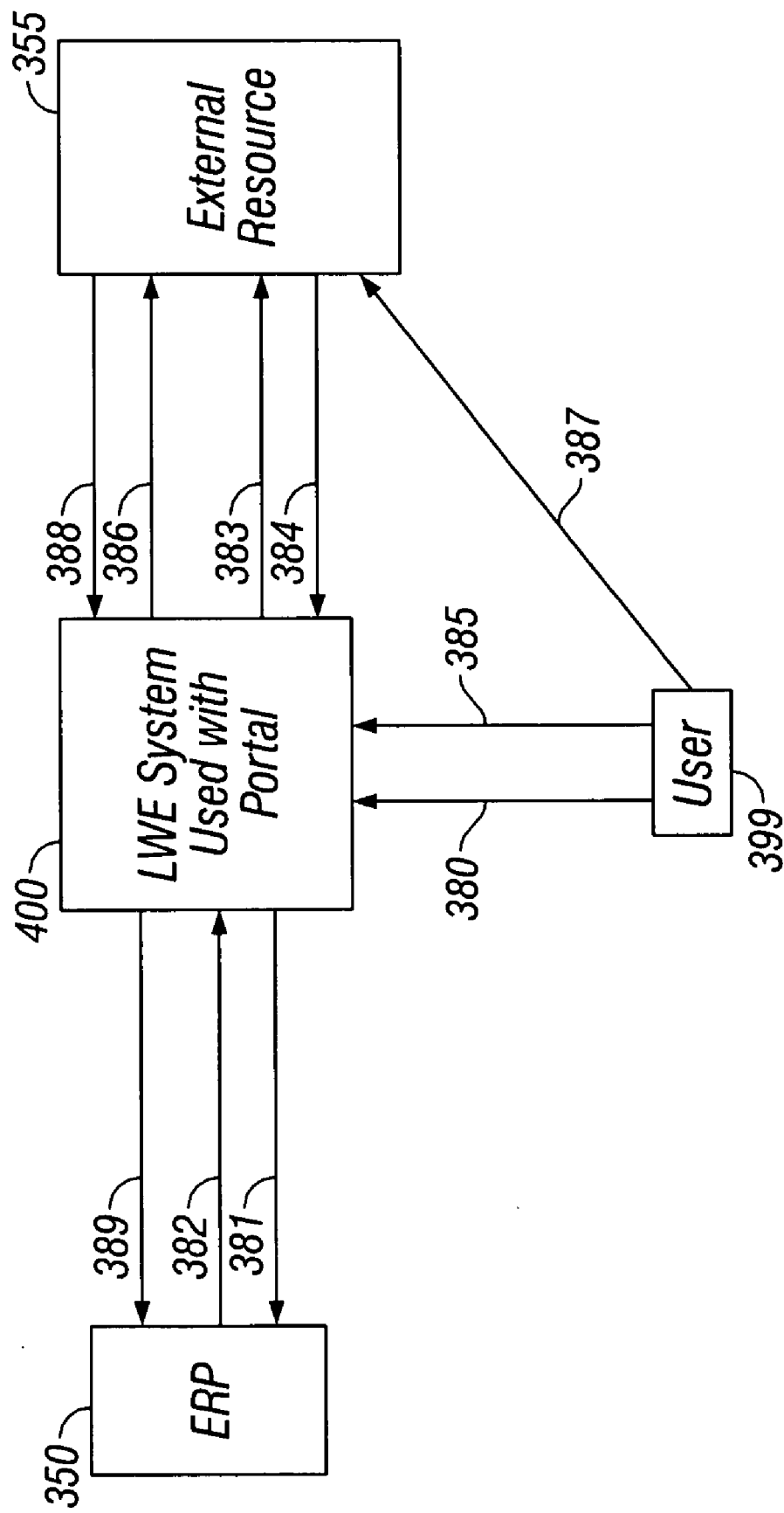

FIG. 3c illustrates an example of such 2-way data flow. In this example, the LWE system 400 is used in conjunction with an enterprise portal, and the user 399 needs to execute a task that requires data from an ERP system 350 and an external resource 355. The user 399 first selects the task (step 380). The LWE system 400 sends a data request to the ERP system 350 (step 381), which returns the requested data (step 382). The LWE system 400 then sends this data to an external resource 355 (step 383), which processes the data and returns the results (step 384). The user 399 then enters some new data, which may be exported to the external resource 355 by the LWE system 400 (steps 385 and 386). Alternatively, the data may be saved directly into the external resource 355 (step 387), and extracted by the LWE system 400 (step 388). The new data is then exported into the ERP system 350 (step 389).

Figure 4:
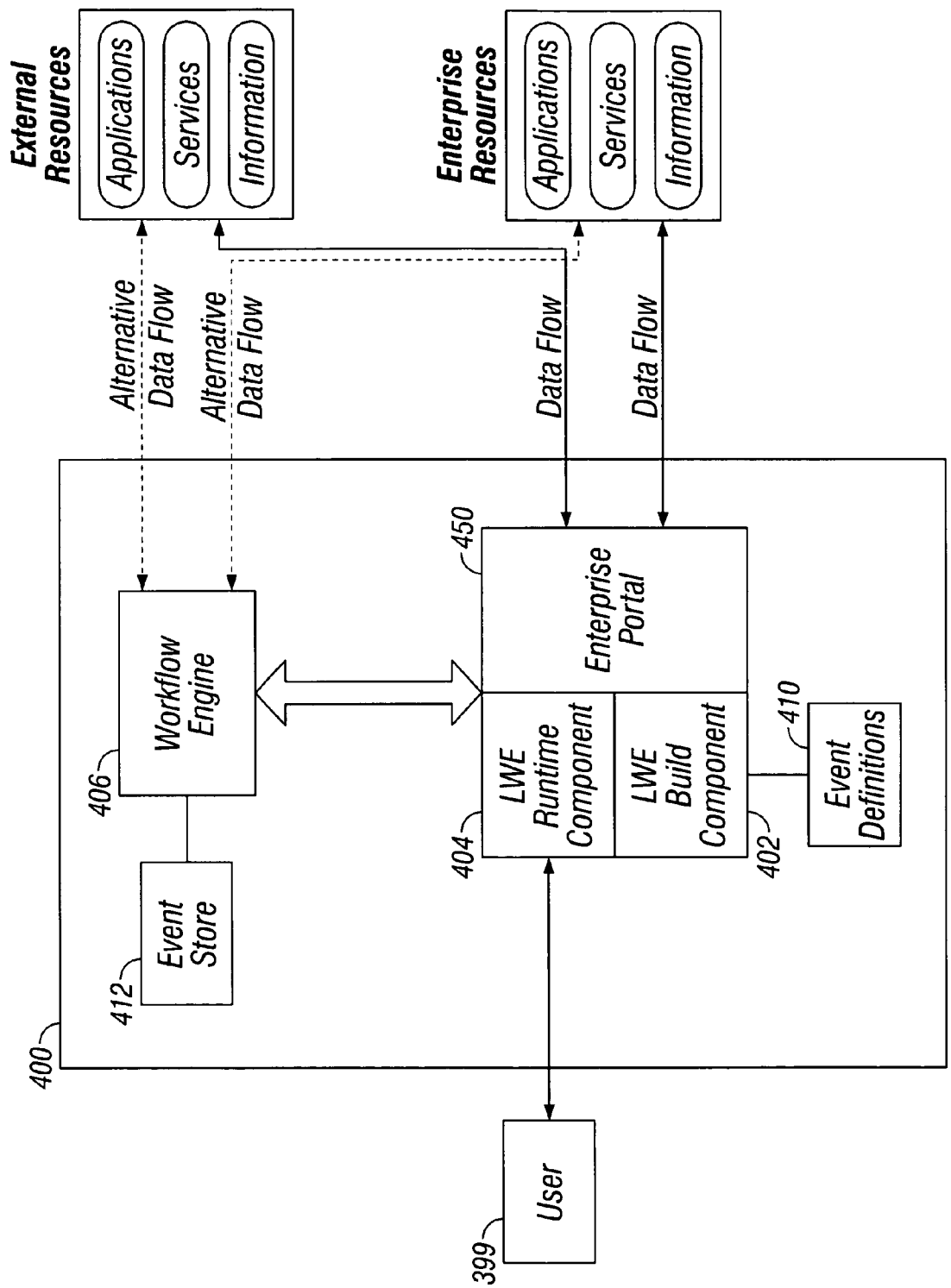
FIG. 4 is a diagram of a system for handling life and work events.

FIG. 4 is a diagram of a system for handling life and work events. In the example in FIG. 4, the LWE system 400, which is used in conjunction with an enterprise portal 450, is comprised of three primary components—a build component 402, a runtime component 404, and a workflow engine 406.

The build component 402 is used to build event definitions 410. As described above, an event essentially comprises a list of tasks, and a task comprises one or more application, service, or segment of information (or combination thereof). Pre-configured event definitions may be used to build customized events, and groups of pre-configured events can be defined for and assigned to specific roles within an enterprise portal.

The build component 402 may include tools to create, copy, and edit events. Events may also be linked into hierarchies, so that modifications to a higher-level event definition are automatically reflected in the definitions of lower-level events. Event definitions may be imported from or exported to event processing systems from third parties. Event definitions may also be versioned.

The runtime component 404 of the LWE system 400 may be used to create event instances from event definitions 410. Events may be instantiated either by a user 399 (e.g., when a manager finds out that a customer is coming to visit, he may create an instance of a "customer visit" event), or by the system (e.g., an event instance may be triggered by the occurrence of a specific condition). In one embodiment, multiple instance of an event may be created from the same event definition. Multiple instances of an event may require multiple versions of event definitions, so that an instantiated event may continue to run even when the event definition that was used to instantiate the event is changed. Event instances may also be personalized. For example, an event definition may specify that some tasks are optional, in which case the user is given the option of de-selecting such tasks when such an event is instantiated.

The runtime component 404 may also be used in conjunction with the workflow engine 406 to process event instances and to enable event management functionality. The workflow engine 406 depicted in FIG. 4 controls task handling, and updates and stores the status of instantiated events in an event store 412, which enables users to process events over an extended period of time. Workflow engines are commercially available from a number of vendors, including Staffware, Savvion, and Intalio, but such workflow engines may be customized to provide additional functionality. For example, and event definition may specify that tasks within a particular event may be executed in sequence, in parallel, or in a combination of the two (i.e., some tasks may be performed in parallel, while others must be performed in sequence). The workflow engine 406 would then ensure that the user 399 performs the required tasks in a sequence that complies with the constraints specified in the event definition. Alternatively, the workflow engine 406 may change the order of tasks based on timing or other requirements, or the workflow engine 406 may change the order of tasks dynamically, based on the occurrence of internal or external events.

The runtime component 404 and the workflow engine 406 may also allow users to keep track of their progress through an event's task list, for example, by checking tasks off as they are done. In an embodiment in which users may create multiple instances of the same event, the runtime component 404 and the workflow engine 406 may allow users to progress through those multiple instances at different rates. To accomplish this functionality, instances are stored in a user context rather than a global context.

The runtime component 404 and workflow engine 406 may also include a wizard to help guide users through a particular sequence of tasks. Wizards may be helpful in handling complicated task lists (e.g., when some of the tasks must be performed in sequence, while some of the tasks may be performed in parallel).

The LWE system's workflow features may enable collaboration among multiple participants in an event. For example, an event may be assigned to one or more owners. A task may also be assigned to one or more owners, or delegated to an agent, who would then be responsible for executing that task. An event or a task may also be assigned to an approver, who needs to sign off on the satisfactory completion of the event or the task. An approver may be a manager, a department head, or another specific person. An administrator may also specify the source of information or the destination to which information needs to be sent. In such an implementation, the workflow engine is programmed to ensure that such requirements are satisfied before tasks can be checked off as completed.

Figure 5:
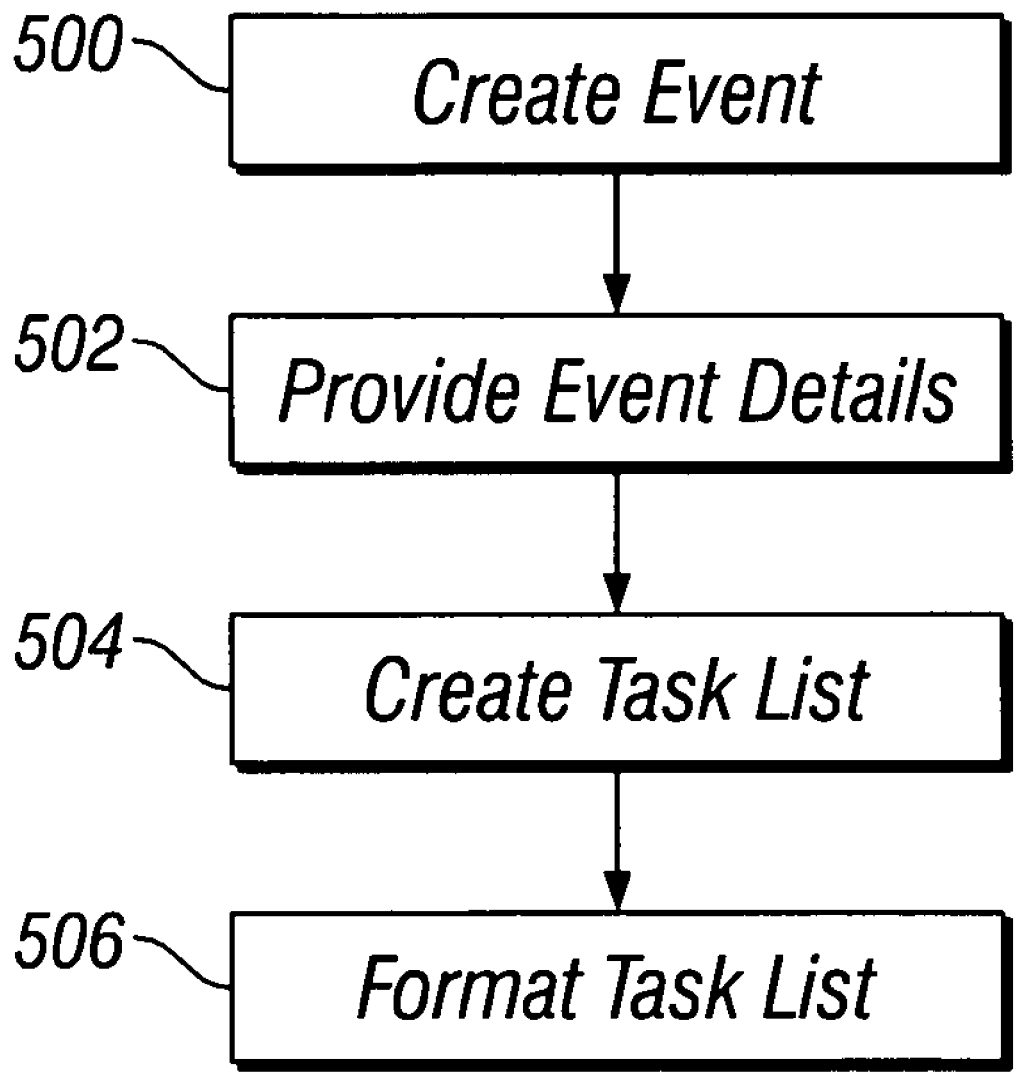
FIG. 5 is a flow chart illustrating a process of creating an event definition.
Figure 6A:
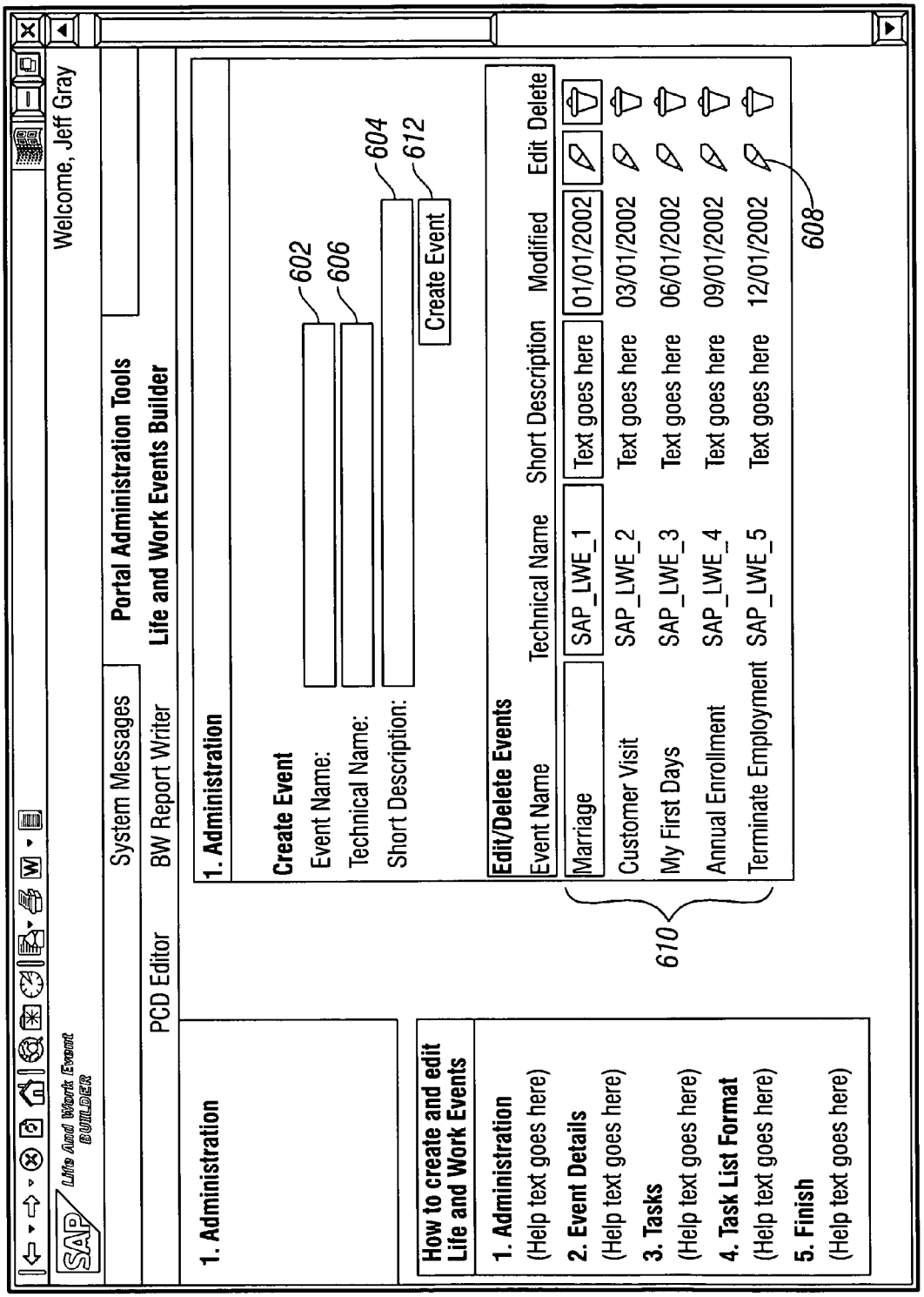
FIGS. 6a-6e are screenshots showing an example of creating an event definition.

FIG. 5 depicts steps that may be used in the process of creating an event definition. In Step 500, an administrator uses the build component 402 to create a new event definition. Step 500 is illustrated in FIG. 6a. When creating an event, the administrator may give the event a name 602, as well as a short description 604. The LWE system can then assign a technical name 606 or handle to the event definition. The administrator may also copy an existing event definition from the list of existing event definitions 610, and then edit the copied event definition by clicking on an edit button 608. When the administrator is ready to proceed to the next step, he can click on the "create event" button 612.

Figure 6B:
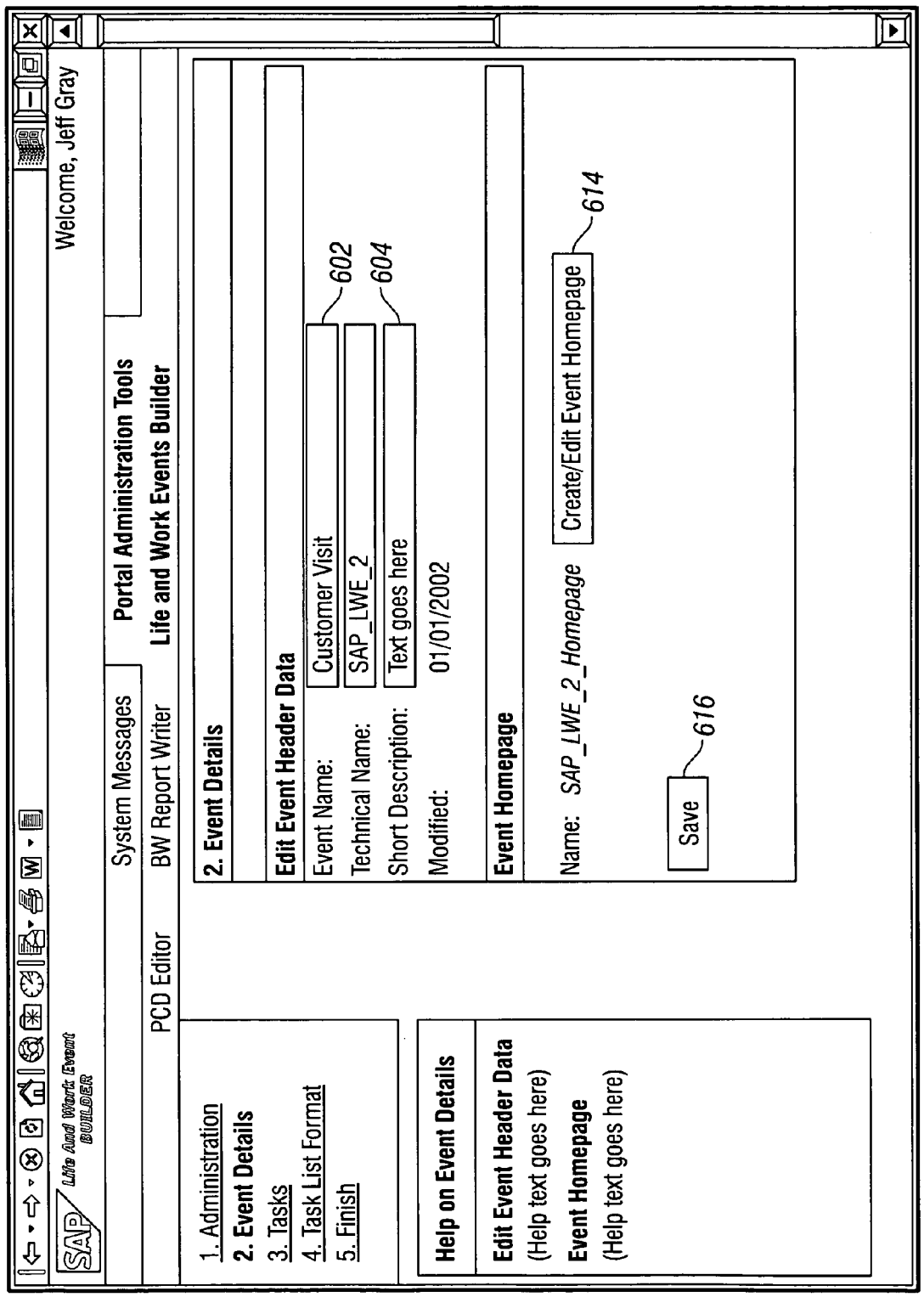

In Step 502, the administrator may edit the event name 602 and the short description of the event definition 604, as shown in FIG. 6b. The administrator then clicks on the "create/edit event home page" button 614 in order to build an event home page (or to edit an existing event home page). As explained above, an event home page may display the initial set of resources the user sees after he has instantiated an event corresponding to the event definition. When the administrator is finished, he may click on the "save" button 616 in order to save the portion of the event definition that has been created thus far, and proceed to the next step in the event creation process.

Figure 6C:
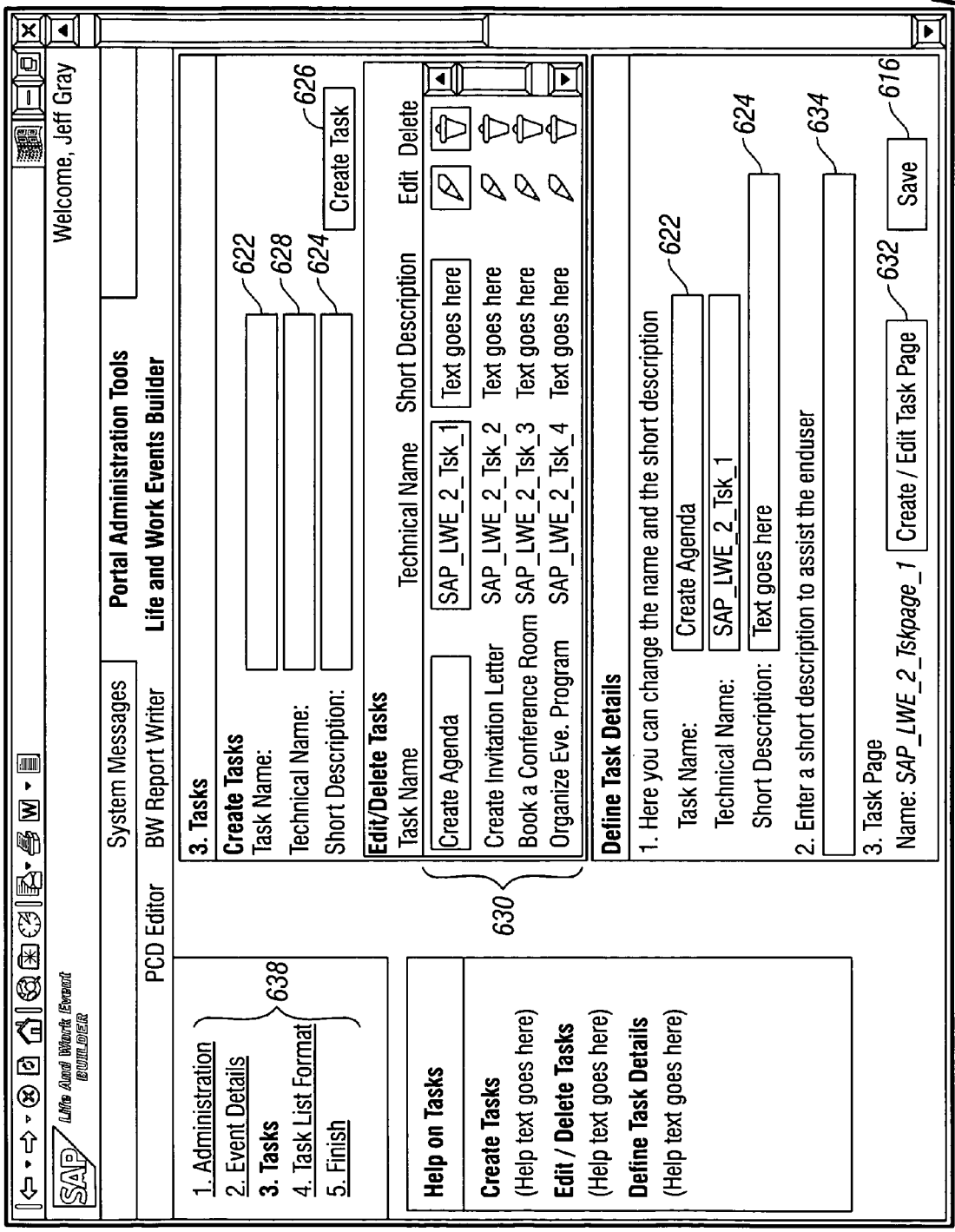

In Step 504, the administrator creates a task list for the event, as illustrated in FIG. 6c. As part of this step, the administrator may provide details for each task, including a name 622 and a short description 624 of the task. When the administrator clicks on the "create task" button 626, the LWE system may assign a technical name 628 or handle to the current task being created, and add the current task to the event task list 630.

The administrator then builds a task page for each task in the event task list 630 by selecting a task from the task list 630 and clicking on the "create/edit task page" button 632. The task page of a task can display the resources associated with the task (i.e., the resources the user may need to access or execute in order to complete the task).

The administrator may edit a task's name 622 or short description 624, as well as add a user description 634 that may be displayed to the user to help the user understand what he is supposed to do in order to execute the task properly.

When the administrator is ready to proceed to the next step, he may click on the "save" button 616, which saves the portion of the event definition that has been created thus far. Alternatively, the administrator may navigate to a different step in the event creation process by selecting one of the links in the creation process list 638. The links shown in the creation process list 638 generally correspond to the steps illustrated in FIG. 5.

Figure 6D:
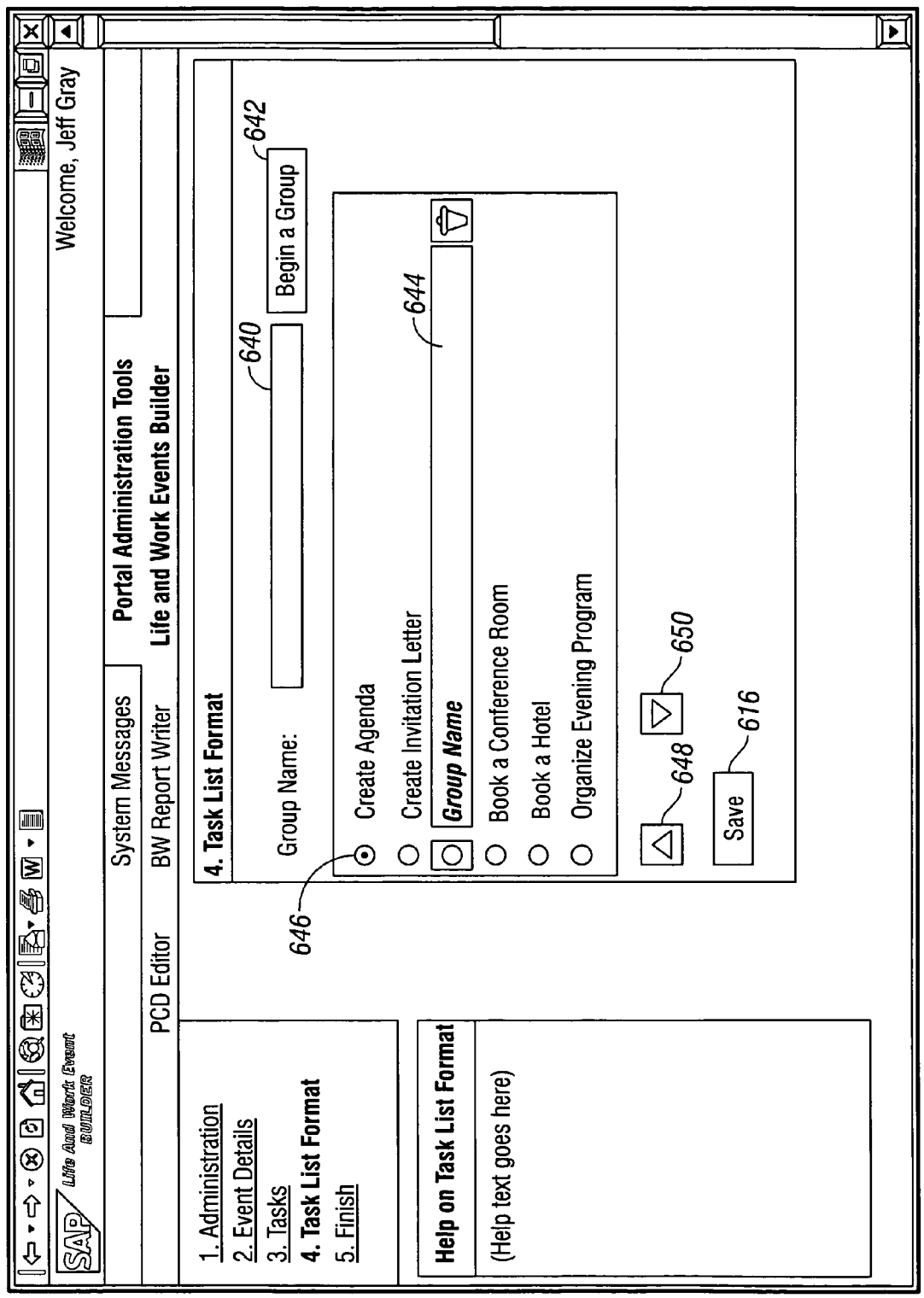

In Step 506, the administrator formats the list of tasks into a presentation format in a way that helps the user navigate through the tasks, as illustrated in FIG. 6d. Any of several different navigation models may be used. The simplest model is a flat list of tasks. FIG. 7a depicts another arrangement, in which tasks are organized into groups. In FIG. 7a, tasks 711, 712, and 713 are grouped into a first group 710, and tasks 721, 722, and 723 are grouped into a second group 720. A simple grouping arrangement is also shown in FIG. 6d. The administrator may begin a new group by typing in a group name 640 and clicking on the "begin a group" button 642. The example in FIG. 6d shows one group 644. The administrator may rearrange the tasks within groups by clicking on a task radio button 646, and then clicking on either the "move up" button 648 or the "move down" button 650.

Figure 7B:
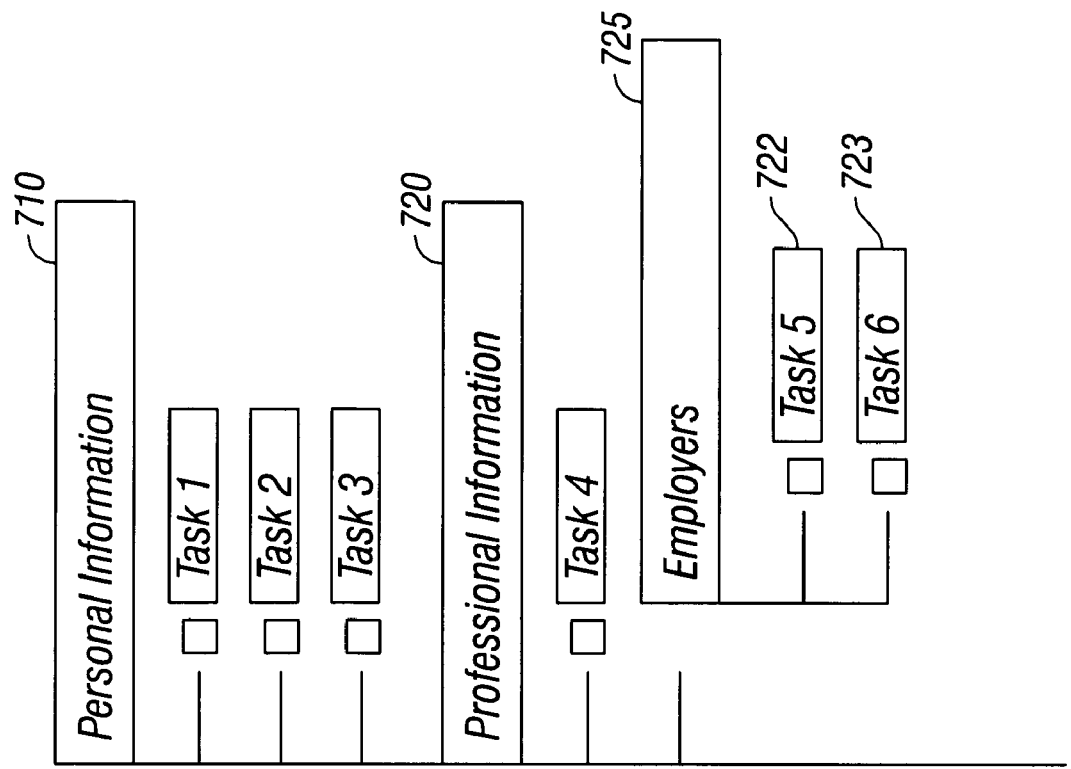
FIGS. 7a-7d are representations of various navigation models.
Figure 7A:
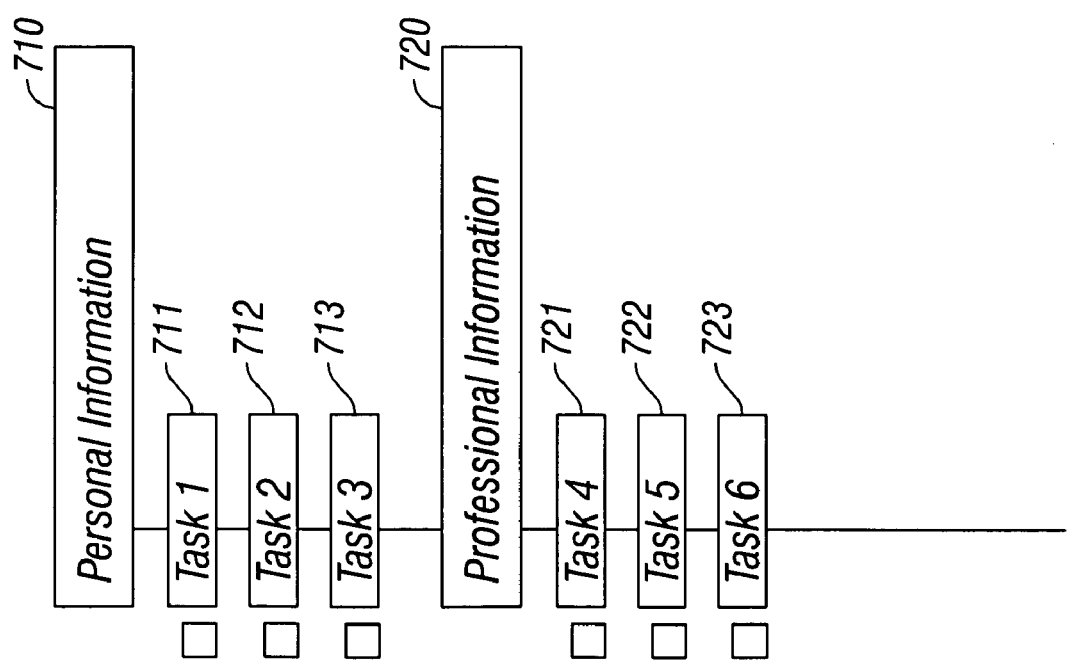

FIG. 7b depicts an alternative arrangement of tasks in which groups may be nested within each other. In FIG. 7b, tasks 722 and 723 have been put into a new group 725, and the entire new group 725 has been nested within group 720.

Figures 7C, 7D:
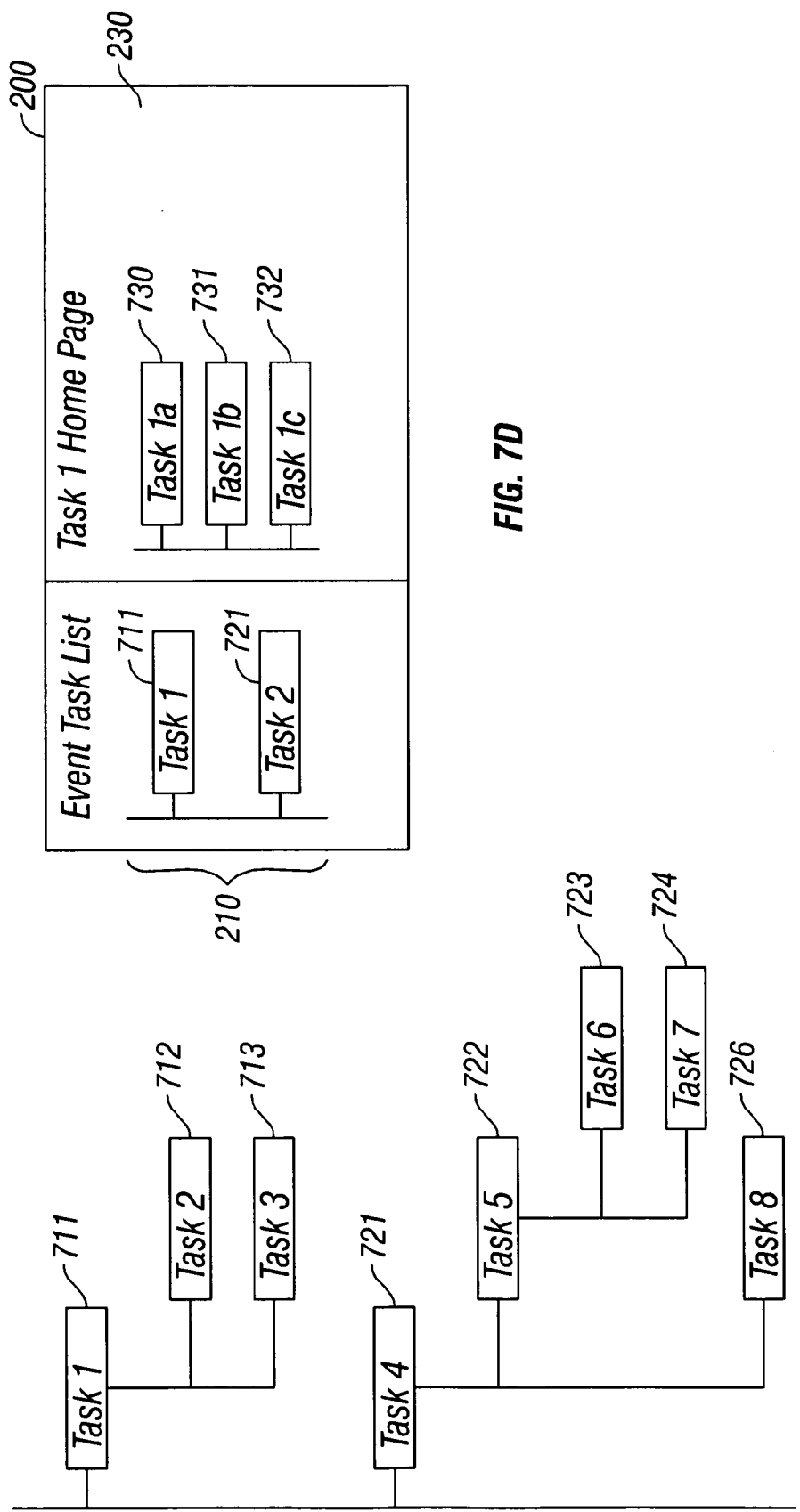

FIG. 7c depicts another alternative arrangement in which tasks can be nested into trees. In FIG. 7c, tasks 712 and 713 are shown as sub-tasks of task 711. Tasks 721 has two sub-tasks (tasks 722 and 726), and sub-task 722 itself has two sub-tasks (tasks 723 and 724).

FIG. 7d depicts yet another alternative arrangement, in which tasks are organized into nested lists. Task list 210 in interface 200 shows a first task 711 and a second task 721. Task page 230 corresponding to task 711 shows that task 711 comprises three sub-tasks (tasks 730, 731, and 732). The user can click on tasks 730, 731, or 732 to be shown the task pages that correspond to those tasks.

In addition to different navigation models, colors and other enhancements may be used to show different task priorities. For example, high priority tasks can be colored red, while normal priority tasks can be colored black. Different navigation models and enhancements may be used to make it easier for users to identify an appropriate sequence in which to process tasks associated with an event.

Figure 6E:
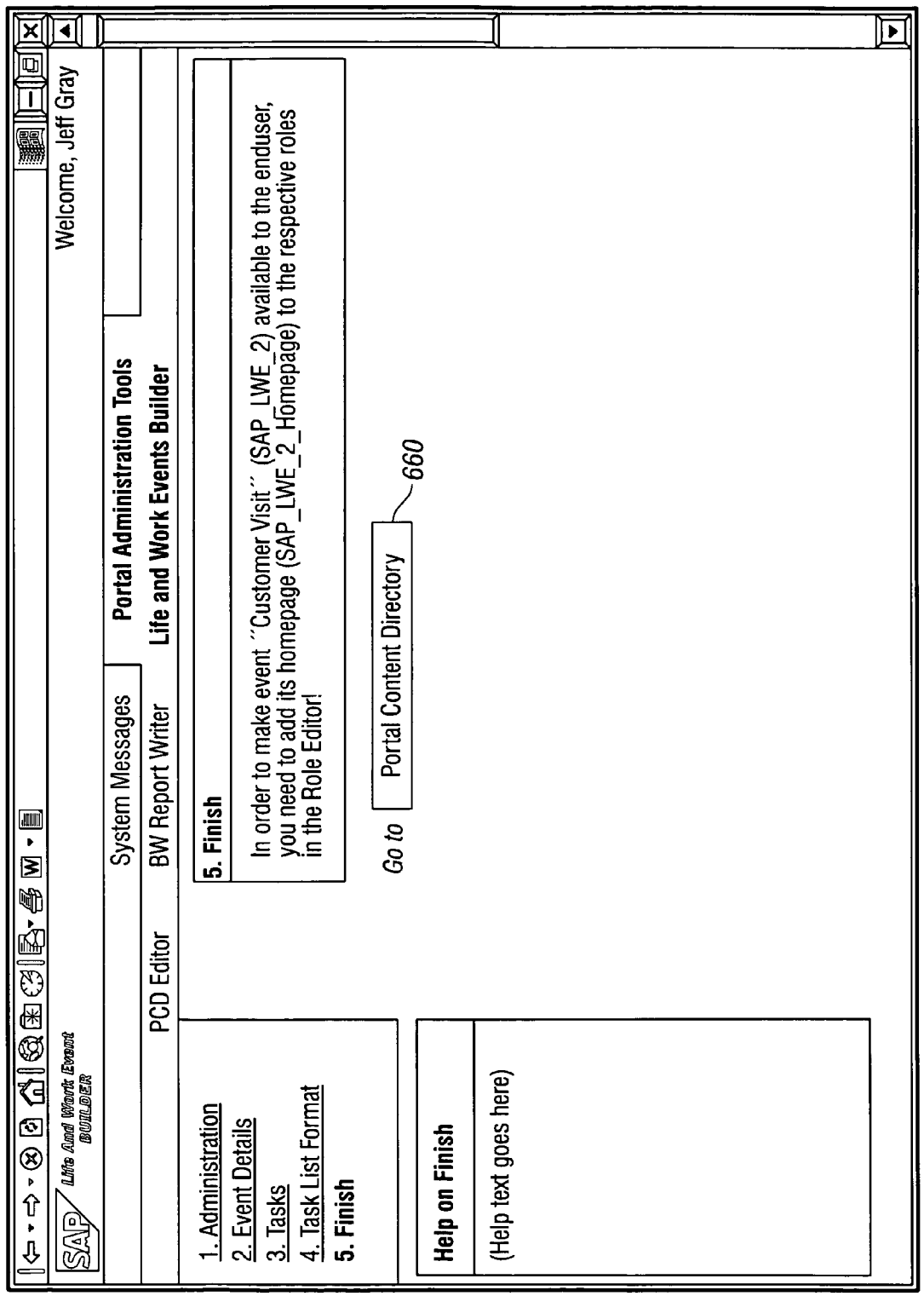

After the task list is formatted, the administrator may have to go through a finishing step to make the event definition available to users, as shown in FIG. 6e. For example, when the LWE system is used in conjunction with an enterprise portal, the event administrator can associate an event home page with the roles of the users who may need to process such an event. In FIG. 6e, the administrator can click on the "portal content directory" button 660 to be shown the list of roles that have been defined for the portal; the administrator may then choose the appropriate roles to which to add the event definition that is being created.

Creating an event definition may involve additional steps or sub-steps. For example, an administrator may specify an ordering sequence in which the tasks associated with an event must be executed. The administrator may specify, for instance, that some of the tasks in an event may be performed in an order-independent manner (e.g., in any order, or substantially in parallel). The administrator may also specify that some of the tasks in an event are to be performed in an order-dependent manner (e.g., a specified sequence). Alternatively, the administrator may specify that some of the tasks in an event may be performed in an order-independent manner, while others are to be performed in an order-dependent manner. The administrator may also indicate a wizard utility to guide the user through an appropriate sequence of order-dependent tasks.

In addition, the administrator may allow the user to personalize an event instance. For example, the administrator may designate certain tasks as optional and certain tasks as mandatory. When the user instantiates an event based upon such an event definition, he may then de-select some or all of the tasks that the administrator designated as optional.

The process of creating event definitions may also involve the step of linking event definitions. If two event definitions are linked, changes in one event definition may be automatically reflected in the linked event definition. For example, an administrator may create an event definition representing customer visits from Japan. The administrator may create such an event definition by copying the event definition of a generic customer visit, and then modifying that definition, for example, by adding a task such as locating a translator. The administrator may then link the Japanese customer visit event definition to the generic customer visit event definition. If the administrator subsequently makes a change to the event definition of a generic customer visit, the change may be reflected in the event definition of a Japanese customer visit.

Additional enhancements may be made to the process of creating event definitions. For example, the LWE system may allow the administrator to create multiple versions of an event definition. This would be useful, for example, when an administrator updates an event definition while an event instance based on that event definition is running. In such a scenario, the instantiated event may continue to run based on the old version of the event definition, while any new event instantiation would be based on the new version of the event definition.

The LWE system may also allow the administrator to import event definitions that are created by third parties. For example, an administrator may import an event definition from an event processing system produced by a competing manufacturer, or from a repository where users of the system may store event definitions that they have created themselves. The LWE system may also allow the administrator to export event definitions. For example, the administrator may export event definitions into a repository where users can access those event definitions and use them to create new event definitions.

The process of creating an event definition may be carried out by an administrator using interface controls provided in a graphical user interface. As shown in FIGS. 6a-6e, such a graphical user interface may comprise graphical abstractions, including one or more text entry fields, buttons, menus, icons, or links. The user interface controls may also be provided in a browser-based application.

Figure 8:
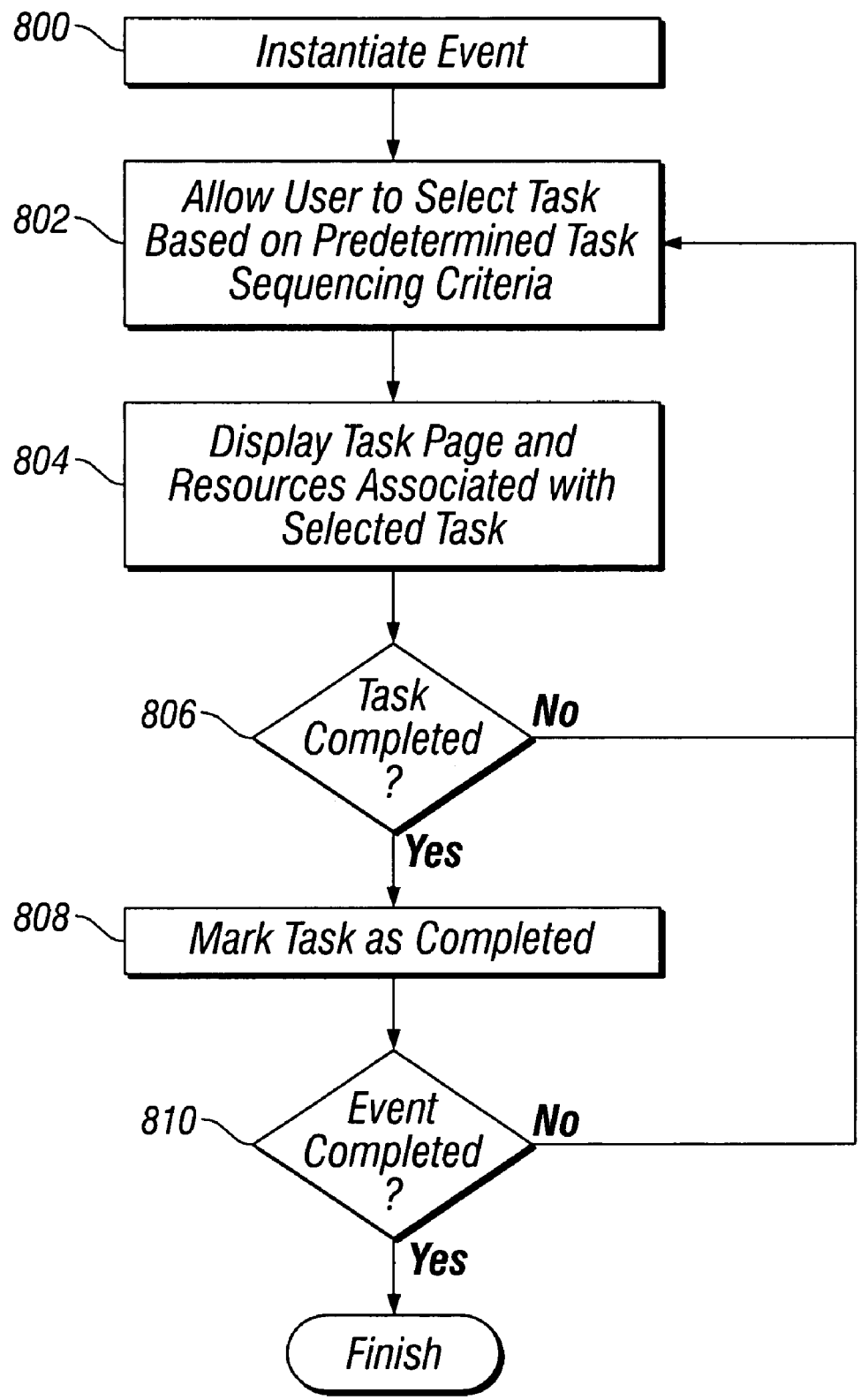
FIG. 8 is a flow chart illustrating a process of handling an event.

FIG. 8 depicts steps that may be used in instantiating and processing an event. In Step 800, an event is instantiated based on the definition that was created for that event. In step 802, the user is allowed to select a task to work on based on predetermined task ordering criteria, as defined above. For example, if an event definition specifies that the tasks for a particular event may all be performed in parallel, then the user can select any of the event's tasks to work on. However, if the event definition specifies that the tasks must be performed sequentially, than the user cannot select a task to work on until all its predecessor tasks have been completed.

In Step 804, the task page of the selected task is displayed, from which the user can access the various resources that may be needed to complete the task. In Step 806, if the task is not completed, the user may return to Step 802 and select another task to work on, provided that such an action is permissible by the task sequencing specified in the event definition. Returning to Step 806, if the task was completed, the user then proceeds to Step 808, where the task is marked off as completed. The user may mark off the completed task manually; alternatively, the system may automatically mark off a completed task upon the occurrence of a specific event, such as the closing of an application associated with the task.

A check is then performed in Step 810 to see if all of the tasks for a particular event have been completed; if so, the event itself is completed, otherwise, the user returns to Step 802, where he may select another task to work on.

Processing an event may involve additional steps. For example, after an event is instantiated, a user may de-select tasks that are specified as optional in an event definition. Error-handling features and routines may also be built into the LWE system. For example, the LWE system may prevent the user from selecting or processing a task that has already been marked as completed. The LWE system may also include features such as specifying due dates for events, and the ability to interface with the user and to handle resources and event definitions in multiple languages. Event due dates may be specified by an administrator when creating an event definition, or by a user or the LWE system when an event is instantiated.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

To provide for interaction with a user, a computer system can be used having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users. Other embodiments are within the scope of the following claims.

What is claimed is:

1. A system for organizing access to resources, the system comprising:
   a build component that electronically receives instructions from an administrator to specify an event definition comprising one or more tasks to be completed in handling an event, a task order, and, for each task, one or more resources associated with completing the task;
   a runtime component that electronically receives instructions from an administrator to create at least one event instance based on the event definition; and
   a workflow engine that interacts with the runtime component to enable a user to process the event instance by displaying resources associated with completing a selected task, wherein the resources are displayed in a task page and comprise data extracted from a database and a program application that is available over a network,
   wherein the build component enables the user to specify additional resources, associated with completing the task, that are displayed in the task page.

2. The system of claim 1, further comprising:
   a user interface control for the administrator and a user interface control for the user,
   wherein the user interface controls comprise graphical abstractions.

3. The system of claim 2 wherein the graphical abstractions comprise one or more text entry fields, buttons, menus, icons, and links.

4. The system of claim 2 wherein the runtime component and the user interface controls enable the user to create two or more event instances based on the event definition.

5. The system of claim 4 wherein each event instance is processed independently.

6. The system of claim 1 wherein the user interface controls are provided in a browser-based application.

7. The system of claim 1 wherein the event comprises a life or work event.

8. The system of claim 1 wherein the build component further enables the administrator to store the event definition.

9. The system of claim 1 wherein the build component further enables the administrator to associate the event definition with one or more roles in a role-based portal.

10. The system of claim 1 wherein specifying the event definition comprises specifying a navigation model for presentation of the one or more tasks.

11. The system of claim 1 wherein the task order includes an indication whether two or more tasks are to be performed in an order-dependent manner or in an order-independent manner.

12. The system of claim 1 wherein the event definition further comprises an indication whether one or more tasks are optional or mandatory.

13. The system of claim 1 wherein the event definition further comprises a specification of a home page.

14. The system of claim 1 wherein the event definition further comprises a specification of a due date.

15. The system of claim 1 wherein the event definition further comprises a specification that the event requires collaboration among two or more participants.

16. The system of claim 1 wherein the runtime component further enables the user to personalize the event instance.

17. The system of claim 16 wherein personalizing the event instance comprises deselecting one or more tasks.

18. The system of claim 16 wherein personalizing the event instance comprises identifying two or more participants who are to collaborate in processing the event instance.

19. The system of claim 1 wherein processing the event instance comprises accessing the resources associated with each task.

20. The system of claim 1 wherein processing the event instance comprises monitoring the status of the event instance.

21. The system of claim 20 wherein monitoring the status of the event instance comprises monitoring the status of the one or more tasks.

22. The system of claim 20 wherein monitoring the progress of the event instance comprises marking each task as completed upon its completion.

23. The system of claim 1 further comprising an event store.

24. The system of claim 23 wherein processing the event instance comprises storing the event instance in the event store.

25. The system of claim 1 wherein the workflow engine ensures that the user completes the tasks in a sequence that complies with the task order.

26. The system of claim 25 wherein the task order further comprises an indication that two or more tasks are to be performed in an order-dependent manner or in an order-independent manner.

27. The system of claim 26 wherein the task order comprises an indication that two or more tasks that are to be performed in an order-dependent manner are to be performed in a specified sequence.

28. The system of claim 26 wherein the task order comprises an indication that two or more tasks that are to be performed in an order-independent manner may be performed in any order or substantially in parallel.

29. The system of claim 25 wherein the task order comprises an indication that a plurality of tasks are to be performed in an order-dependent manner and that another plurality of tasks are to be performed in an order-independent manner.

30. The system of claim 25 further comprising a wizard to guide the user through the sequence of tasks.

31. A computer-assisted method for organizing access to resources, the method comprising:
  enable an administrator to specify an event definition comprising one or more tasks to be completed in handling an event, a task order, and, for each task, one or more resources associated with completing the task;
  enable the administrator to create at least one event instance based on the event definition;
  enable a user to process the event instance by displaying resources associated with completing a selected task, wherein the resources are displayed in a task page and comprise data extracted from a database and a program application that is available over a network; and
  enable the user to specify additional resources, associated with completing the task, that are displayed in the task page.

32. The method of claim 31 wherein the specifying and creating operations are performed by the administrator using interface controls provided in a graphical user interface, and the processing operations are performed by the user using interface controls provided in a graphical user interface.

33. The method of claim 32 wherein the user interface controls comprise graphical abstractions.

34. The method of claim 33 wherein the graphical abstractions comprise one or more of text entry fields, buttons, menus, icons, and links.

35. The method of claim 32 wherein the user interface controls are provided in a browser-based application.

36. The method of claim 31 wherein the event comprises a life or work event.

37. The method of claim 31 further comprising enabling the user to store the event definition.

38. The method of claim 31 wherein the operation to specify the event definition comprises associating the event definition with one or more roles in a role-based portal.

39. The method of claim 31 wherein the event definition further comprises a navigation model for presentation of the one or more tasks.

40. The method of claim 31 wherein the task order includes an indication whether two or more tasks are to be performed in an order-dependent manner or in an order-independent manner.

41. The method of claim 31 wherein the event definition further comprises an indication whether one or more tasks are optional or mandatory.

42. The method of claim 31 wherein the event definition further comprises a specification of a home page.

43. The method of claim 31 wherein the event definition further comprises a specification of a due date.

44. The method of claim 31 wherein the event definition further comprises a specification that the event requires collaboration among two or more participants.

45. The method of claim 31 further comprising enabling the user to personalize the event instance.

46. The method of claim 45 wherein personalizing the event instance comprises deselecting one or more tasks.

47. The method of claim 45 wherein personalizing the event instance comprises identifying two or more participants who are to collaborate in processing the event instance.

48. The method of claim 31 wherein the operation to process the event instance comprises accessing the resources associated with each task.

49. The method of claim 31 wherein the operation to process the event instance comprises monitoring the status of the event instance.

50. The method of claim 49 wherein monitoring the status of the event instance comprises monitoring the status of the one or more tasks.

51. The method of claim 49 wherein monitoring the progress of the event instance comprises marking each task as completed upon its completion.

52. The method of claim 31 wherein the operation to create at least one event instance comprises creating two or more event instances based on the event definition.

53. The method of claim 52 wherein each event instance is processed independently.

54. The method of claim 31 wherein the operation to process the event instance comprises storing the event instance.

55. The method of claim 31 wherein the operation to process the event instance comprises completing the tasks in a sequence that complies with the task order.

56. The method of claim 55 wherein the task order further comprises an indication that two or more tasks are to be performed in an order-dependent manner or in an order-independent manner.

57. The method of claim 56 wherein the task order comprises an indication that two or more tasks that are to be performed in an order-dependent manner are to be performed in a specified sequence.

58. The method of claim 56 wherein the task order comprises an indication that two or more tasks that are to be performed in an order-independent manner may be performed in any order or substantially in parallel.

59. The method of claim 55 wherein the task order comprises an indication that a plurality of tasks are to be performed in an order-dependent manner and that another plurality of tasks are to be performed in an order-independent manner.

60. The method of claim 55 wherein the operation to process the event instance occurs under guidance of a wizard utility.

61. A machine-readable medium comprising instructions that, when executed, cause a machine to perform operations comprising:
enable an administrator to specify an event definition comprising one or more tasks to be completed in handling an event, a task order, and, for each task, one or more resources associated with completing the task;
enable the administrator to create at least one event instance based on the event definition;
enable a user to process the event instance by displaying resources associated with a selected task, wherein the resources are displayed in a task page and comprise data extracted from a database and a program application that is available over a network; and
enable the user to specify additional resources, associated with completing the task, that are displayed in the task page.

62. The medium of claim 61 wherein the specifying and creating operations are performed by the administrator using interface controls provided in a graphical user interface, and the processing operations are performed by the user using interface controls provided in a graphical user interface.

63. The medium of claim 62 wherein the user interface controls comprise graphical abstractions.

64. The medium of claim 63 wherein the graphical abstractions comprise one or more of text entry fields, buttons, menus, icons, and links.

65. The medium of claim 62 wherein the user interface controls are provided in a browser-based application.

66. The medium of claim 61 wherein the event comprises a life or work event.

67. The medium of claim 61 further comprising instructions that cause the machine to store the event definition.

68. The medium of claim 61 wherein specifying the event definition comprises associating the event definition with one or more roles in a role-based portal.

69. The medium of claim 61 wherein the event definition further comprises a navigation model for presentation of the one or more tasks.

70. The medium of claim 61 wherein the task order includes an indication whether two or more tasks are to be performed in an order-dependent manner or in an order-independent manner.

71. The medium of claim 61 wherein the event definition further comprises an indication whether one or more tasks are optional or mandatory.

72. The medium of claim 61 wherein the event definition further comprises a specification of a home page.

73. The medium of claim 61 wherein the event definition further comprises a specification of a due date.

74. The medium of claim 61 wherein the event definition further comprises a specification that the event requires collaboration among two or more participants.

75. The medium of claim 61 further comprising instructions that cause the machine to personalize the event instance.

76. The medium of claim 75 wherein personalizing the event instance comprises deselecting one or more tasks.

77. The medium of claim 75 wherein personalizing the event instance comprises identifying two or more participants who are to collaborate in processing the event instance.

78. The medium of claim 61 wherein processing the event instance comprises providing access to the resources associated with each task.

79. The medium of claim 61 wherein processing the event instance comprises monitoring the status of the event instance.

80. The medium of claim 79 wherein monitoring the status of the event instance comprises monitoring the status of the one or more tasks.

81. The medium of claim 79 wherein monitoring the progress of the event instance comprises marking each task as completed upon its completion.

82. The medium of claim 61 wherein the operation to create at least one event instance comprises creating two or more event instances based on the event definition.

83. The medium of claim 82 wherein each event instance is processed independently.

84. The medium of claim 61 wherein processing the event instance comprises storing the event instance.

85. The medium of claim 61 wherein processing the event instance comprises completing the tasks in a sequence that complies with the task order.

86. The medium of claim 85 wherein the task order further comprises an indication that two or more tasks are to be performed in an order-dependent manner or in an order-independent manner.

87. The medium of claim 86 wherein the task order comprises an indication that two or more tasks that are to be performed in an order-dependent manner are to be performed in a specified sequence.

88. The medium of claim 86 wherein the task order comprises an indication that two or more tasks that are to be performed in an order-independent manner may be performed in any order or substantially in parallel.

89. The medium of claim 85 wherein the task order comprises an indication that a plurality of tasks are to be performed in an order-dependent manner and that another plurality of tasks are to be performed in an order-independent manner.

90. The medium of claim 85 wherein the operation to process the event instance occurs under guidance of a wizard utility.

* * * * *